(12) United States Patent
Kuboi et al.

(10) Patent No.: US 10,526,186 B2
(45) Date of Patent: Jan. 7, 2020

(54) BEVERAGE SUPPLY APPARATUS

(71) Applicant: The Coca-Cola Company, Atlanta, GA (US)

(72) Inventors: Satoshi Kuboi, Kawasaki (JP); Atsushi Makino, Osaka (JP); Akira Goitsuka, Osaka (JP); Fumihiro Takahashi, Osaka (JP)

(73) Assignee: The Coca-Cola Company, Atlanta, GA (US)

( * ) Notice: Subject to any disclaimer, the term of this patent is extended or adjusted under 35 U.S.C. 154(b) by 0 days.

(21) Appl. No.: 15/521,379

(22) PCT Filed: Oct. 30, 2015

(86) PCT No.: PCT/US2015/058226
§ 371 (c)(1),
(2) Date: Apr. 24, 2017

(87) PCT Pub. No.: WO2016/069992
PCT Pub. Date: May 6, 2016

(65) Prior Publication Data
US 2017/0305735 A1    Oct. 26, 2017

(30) Foreign Application Priority Data
Oct. 31, 2014    (JP) .................................. 2014-223638

(51) Int. Cl.
*B67D 1/08* (2006.01)
*B67D 1/00* (2006.01)
(Continued)

(52) U.S. Cl.
CPC ......... *B67D 1/0888* (2013.01); *B67D 1/0027* (2013.01); *B67D 1/0057* (2013.01);
(Continued)

(58) Field of Classification Search
CPC .... B67D 1/0015; B67D 1/0021; B67D 1/004; B67D 2001/0097; B67D 1/04; B67D 1/0888; B67D 1/0882; B67D 1/0894
See application file for complete search history.

(56) References Cited

U.S. PATENT DOCUMENTS 2,757,839 A * 8/1956 Carew ................. B67D 1/0043
137/154
3,271,974 A * 9/1966 Wheeler .............. B67D 1/0027
222/146.1

(Continued)

FOREIGN PATENT DOCUMENTS

JP    2000264397 A    9/2000
JP    2006264733 A    10/2006
(Continued)

*Primary Examiner* — Patrick M. Buechner
(74) *Attorney, Agent, or Firm* — Eversheds Sutherland (US) LLP

(57) ABSTRACT

A beverage supply apparatus may include a touch panel for receiving an operation to select a main syrup from among different types of syrups stored in a number of syrup tank that is diluted with water or carbonated water to form a main beverage and for receiving an operation to select a topping syrup that is added to the main beverage as a flavor. The beverage supply apparatus also may include a nozzle in which the main beverage is produced by mixing water or carbonated water with the main syrup in a predetermined ratio and then the undiluted topping syrup is mixed with the main beverage to produce a beverage.

13 Claims, 5 Drawing Sheets

(51) Int. Cl.
*G06F 3/0488* (2013.01)
*B67D 1/04* (2006.01)

(52) U.S. Cl.
CPC ......... *B67D 1/0882* (2013.01); *B67D 1/0894* (2013.01); *G06F 3/0488* (2013.01); *B67D 1/0021* (2013.01); *B67D 1/0406* (2013.01)

(56) References Cited

U.S. PATENT DOCUMENTS

| | | | | |
|---|---|---|---|---|
| 4,487,333 | A | * 12/1984 | Pounder | B01F 15/00253 222/129.4 |
| 4,753,370 | A | 6/1988 | Rudick | |
| 4,903,862 | A | * 2/1990 | Shannon | B67D 1/0009 222/108 |
| 4,979,639 | A | * 12/1990 | Hoover | B67D 1/0037 137/625.19 |
| 5,803,320 | A | * 9/1998 | Cutting | B67D 1/0036 222/129.1 |
| 6,689,410 | B2 | 2/2004 | Gerber | |
| 7,806,294 | B2 | 10/2010 | Gatipon et al. | |
| 2001/0048958 | A1 | * 12/2001 | Funk | A47J 31/402 426/231 |
| 2002/0060226 | A1 | * 5/2002 | Kameyama | B67D 1/0037 222/1 |
| 2007/0114244 | A1 | 5/2007 | Gatipon et al. | |
| 2007/0145074 | A1 | * 6/2007 | Sevcik | B67D 1/06 222/129.1 |
| 2007/0205221 | A1 | * 9/2007 | Carpenter | B67D 1/0051 222/129.4 |
| 2009/0069933 | A1 | * 3/2009 | Rudick | B67D 1/0034 700/239 |
| 2009/0095771 | A1 | * 4/2009 | Hoover | B67D 1/0022 222/129.1 |
| 2009/0120958 | A1 | 5/2009 | Landers et al. | |
| 2010/0125362 | A1 | * 5/2010 | Canora | G06Q 20/3278 700/236 |
| 2010/0200110 | A1 | * 8/2010 | Segiet | B67D 1/0888 141/94 |
| 2010/0327017 | A1 | 12/2010 | Romanyszyn et al. | |
| 2013/0106690 | A1 | 5/2013 | Lim | |
| 2013/0180622 | A1 | 7/2013 | Scotti | |
| 2014/0263410 | A1 | 9/2014 | Quartarone | |
| 2015/0191341 | A1 | * 7/2015 | Martindale | B67D 1/0888 222/1 |
| 2015/0210522 | A1 | * 7/2015 | Jersey | B67D 1/0028 222/1 |
| 2016/0023883 | A1 | * 1/2016 | Jersey | B67D 1/1204 222/434 |

FOREIGN PATENT DOCUMENTS

| | | |
|---|---|---|
| JP | 3947914 B2 | 7/2007 |
| JP | 2009255990 A | 11/2009 |
| JP | 2012510886 A | 5/2012 |
| WO | 2014034826 A1 | 3/2014 |

* cited by examiner

| Brand | Physical button |
|---|---|
| D | 3a |
| G | 3b |
| A, B, C, E, F, H, I, J, water, carbonated water | 3c |

FIG. 5

BEVERAGE SUPPLY APPARATUS

TECHNICAL FIELD

The present application relates generally to a beverage supply apparatus for supplying a number of beverages from a number of syrup supplies.

BACKGROUND OF THE INVENTION

A conventional beverage supply apparatus may produce a beverage by mixing a syrup and diluting water and then supplying the mixed beverage. This kind of beverage supply apparatus normally may produce and supply multiple types of different beverages.

Specifically, the beverage supply apparatus may include a button that receives an operation to select a beverage to be produced. When the button is depressed, the syrup required to produce the beverage is discharged from among different types of syrups stored in multiple syrup tanks. At the same time, the beverage supply apparatus may discharge diluting water that is mixed with the syrup to produce the beverage.

Patent Document 1 (JP 3947914 B2) describes an example of this kind of beverage supply apparatus. Gas pressure may be applied to a syrup stored in a syrup tank and a solenoid valve positioned in a syrup supply channel may be intermittently opened and closed such that syrup is discharged and diluted with water.

The limited options in terms of beverage flavors, however, may be a problem with the technology described in Patent Document 1. The type of syrup used to produce the beverage may be limited only to a single type. Furthermore, it may be conceivable to mix two types of syrups to provide a greater number of options in terms of beverage flavors. The technology described in Patent Document 1, however, is not based on mixing two types of syrups and there is no indication of how the syrups should be mixed.

For example, it may be difficult to produce a beverage in which the balance between the flavors of two types of syrups can be fully appreciated simply by mixing the two. It therefore would be desirable to develop technology enabling simple production of a beverage in which the balance between the flavors of two types of syrups can be fully appreciated.

SUMMARY OF THE INVENTION

An aim of the present application lies in providing a beverage supply apparatus that can effectively increase the number of options in terms of beverage flavors while also allowing the beverage flavors to be appropriately adjusted even if syrups of multiple flavors are mixed.

The present application thus relates to a beverage supply apparatus for supplying a number of types of beverages. The beverage supply apparatus may include an operation receiving section for receiving an operation to select a first syrup from among different types of syrups stored in a number of syrup tanks and that is diluted with water or carbonated water to form a main beverage and for receiving an operation to select a second syrup that is added to the main beverage as a flavor, and a mixing section in which the main beverage is produced by mixing water or carbonated water with the first syrup in a predetermined ratio and the undiluted second syrup is mixed with the main beverage to produce a beverage. The present application thus makes it possible to effectively increase the number of options in terms of beverage flavors while also allowing the beverage flavors to be appropriately adjusted even if syrups of multiple flavors are mixed.

These and other features and improvements of the present application and the resultant patent will become apparent to one of ordinary skill in the art upon review of the following detailed description when taken in conjunction with the several drawings and the appended claims.

BRIEF DESCRIPTION OF THE DRAWINGS

FIG. 5 is a data table that may be used in controlling the beverage supply apparatus according to FIG. 1.

DETAILED DESCRIPTION

Figure 1:
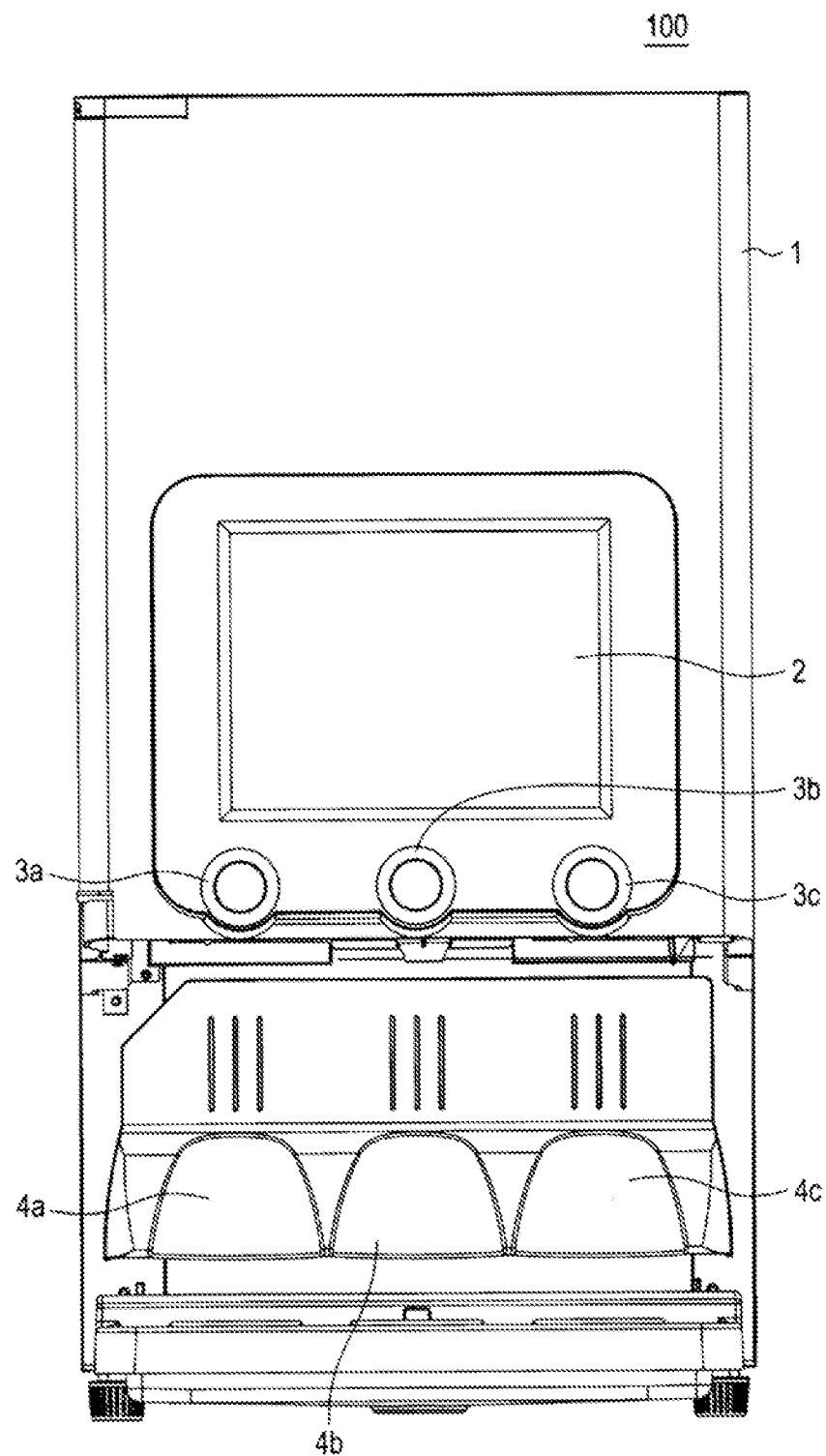
FIG. 1 is a front plan view of a beverage supply apparatus according to an embodiment of the present application.
Figure 2:
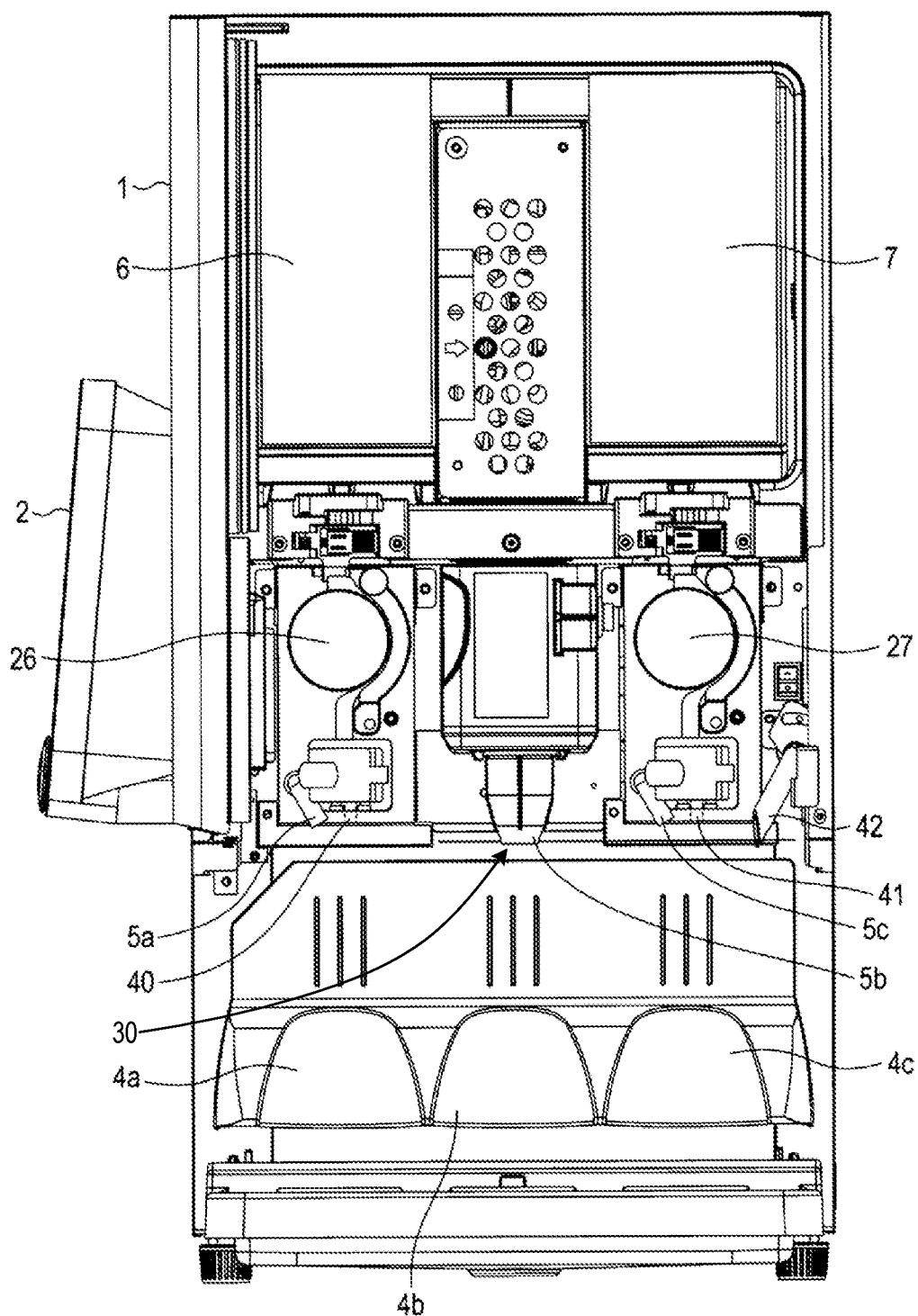
FIG. 2 is a front plan view showing the inside of the beverage supply apparatus according to FIG. 1 with an open front surface door.
Figure 3:
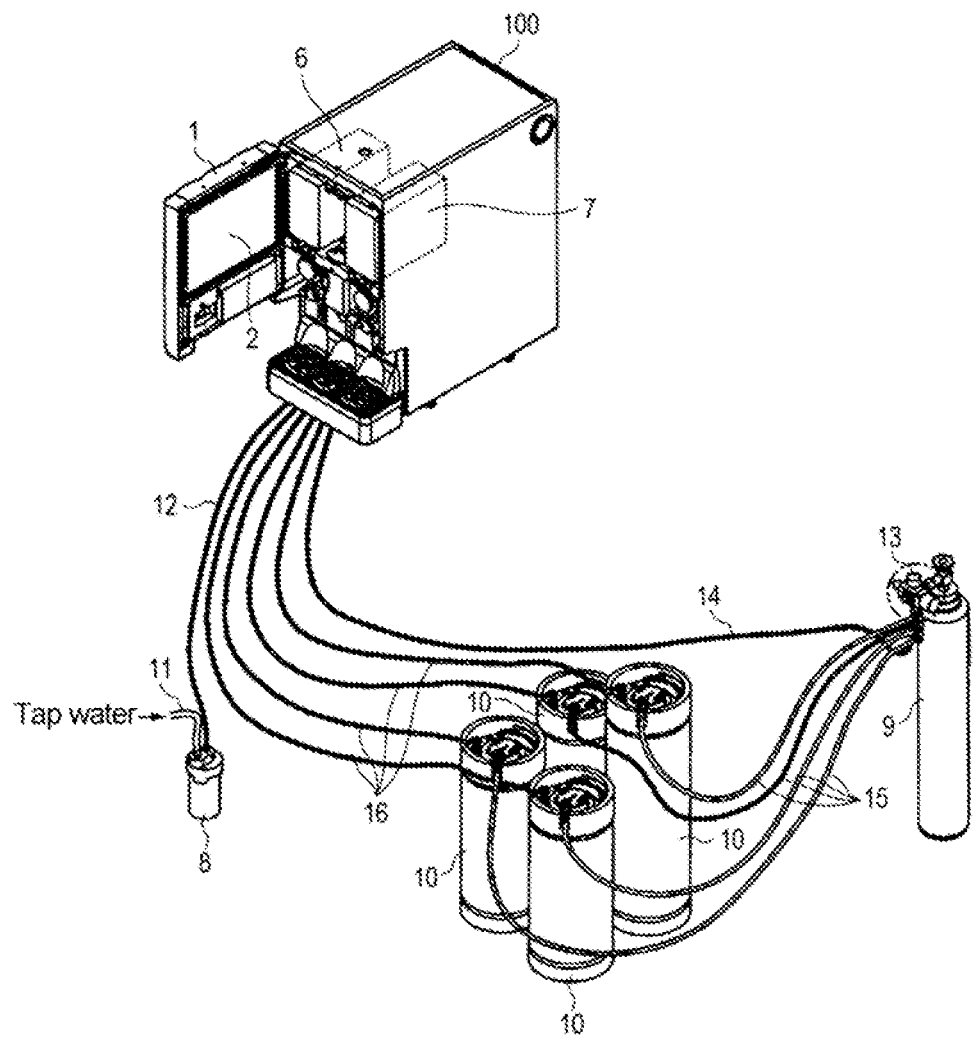
FIG. 3 is a perspective view of an external configuration of the beverage supply apparatus according to FIG. 1.

Referring now to the drawings, in which like numerals refer to like elements throughout the several views, an example of the configuration of a beverage supply apparatus 100 according to an embodiment of the present application will be described first of all with reference to FIG. 1 through FIG. 3. FIG. 1 is a front plan view of the beverage supply apparatus 100 according to an embodiment of the present application. FIG. 2 is a front plan view showing the inside of the beverage supply apparatus 100 according to an embodiment of the present application with an open front surface door. FIG. 3 is a perspective view of the external configuration of the beverage supply apparatus 100 according to an embodiment of the present application.

FIG. 1 shows an example of the beverage supply apparatus 100. The beverage supply apparatus 100 may include a touch panel 2 on a front surface door 1. The front surface door 1 may be opened and closed. The touch panel 2 constitutes an operation receiving section that displays beverage options to a user of the beverage supply apparatus 100 and receives a beverage selection operation performed by the user.

Specifically, the touch panel 2 displays options for a main syrup that may be diluted with carbonated water to form a main beverage as well as options for a topping syrup that may be added to the main beverage as a flavor. The touch panel 2 thus receives a user operation for selecting the main syrup and the topping syrup.

As shown in FIG. 1, physical buttons 3a-3c may be provided below the touch panel 2. The physical buttons 3a-3c may receive a user operation for instructing the discharge of a beverage. Furthermore, container placement locations 4a-4c in which a user places a container (a glass, a cup, etc.) may be provided below the physical buttons 3a-3c.

The physical button 3a corresponds to the container placement location 4a and also corresponds to a diluting water nozzle 5a and a syrup nozzle 40 as shown in FIG. 2. Likewise, the physical button 3b corresponds to the container placement location 4b and also corresponds to a nozzle 5b as shown in FIG. 2. The physical button 3c corresponds to the container placement location 4c and also corresponds to a diluting water nozzle 5*c*, a syrup nozzle 41, and a carbonated water nozzle 42 as shown in FIG. 2.

After a user has performed a beverage selection operation on the touch panel 2, the user places a container in one of the container placement locations 4*a*-4*c* and depresses one of the physical buttons 3*a*-3*c*. If the physical button 3*a* is depressed, for example, a syrup inside a bag-in-box (referred to below as a "BIB") 6 shown in FIG. 2 may be discharged from the syrup nozzle 40 via a BIB tube pump 26, thereby forming a discharge flow. The syrup discharge flow may collide with a diluting water discharge flow from the diluting water nozzle 5*a* and may be mixed therewith. A beverage thus may be produced as a result. The beverage produced in this way may be supplied to the container placed in the container placement location 4*a*.

If the physical button 3*b* is depressed, for example, a syrup and diluting water and/or carbonated water may be mixed in the nozzle 5*b* to produce a beverage. The beverage produced in this way may be discharged from the nozzle 5*b* and may be supplied to the container placed in the container placement location 4*b*.

If the physical button 3*c* is depressed, for example, a syrup inside a BIB 7 shown in FIG. 2 may be discharged from the syrup nozzle 41 via a BIB tube pump 27, thereby forming a discharge flow. The syrup discharge flow may collide with a diluting water discharge flow discharged from the diluting water nozzle 5*c* and/or a carbonated water discharge flow discharged from the carbonated water nozzle 42 and may be mixed therewith. A beverage thus may be produced as a result. The beverage produced in this way may be supplied to the container placed in the container placement location 4*c*.

It should be noted that each of the abovementioned beverages may be supplied to the container while the physical buttons 3*a*-3*c* are being depressed. Furthermore, the carbonated water nozzle 42 may equally be provided on the BIB 6 side or it may equally be provided on both the BIB 6 side and the BIB 7 side.

The BIB's 6, 7 may be provided in a refrigerated area. Syrups that need to be refrigerated may be stored in the BIB's 6, 7. Furthermore, syrups that do not need to be refrigerated may be housed inside syrup tanks 10 that will be described later in the context of FIG. 3. Here, "syrup" as referred to in the present embodiment, may include not only a concentrated liquid containing sugar but also a concentrated liquid not containing sugar (e.g., undiluted solutions of green tea, black tea, and the like).

The nozzle 5*b* may be part of a mixing section 30 in which a main beverage is produced by mixing water or carbonated water with a main syrup in a predetermined ratio and an undiluted topping syrup may be mixed with the main beverage to produce a beverage (referred to below as a "flavor-added beverage"). The flavor-added beverage produced in the nozzle 5*b* may be discharged from the nozzle 5*b* into the container placed in the container placement location 4*b*. The mixing section 30 may include the container placement locations 4*a*, 4*b*, 4*c*; the nozzles 5*a*, 5*b*, 5*c*; the solenoid valves 23, 24, 25; the compressed gas source 9; and the pumps 26, 27.

It thus may be possible to increase considerably the options for flavors of beverages provided to a user by mixing two types of syrups, namely a main syrup and a topping syrup. A syrup that is the same as the main syrup, i.e., a normal syrup having a dilution ratio of about 1:3 to 1:10 may be used as the topping syrup. A "normal syrup" may not be a dedicated topping syrup (having a dilution ratio of about 1:120 to 1:180), rather a "normal syrup" may be a syrup that may be consumed as is by a user on its own once diluted. Here, the main syrup and the topping syrup may be housed in the syrup tanks 10 shown in FIG. 3. It should be noted that the nozzle 5*b* also discharges water alone or carbonated water alone, in addition to discharging the flavor-added beverage.

As shown in FIG. 3, the beverage supply apparatus 100 may be provided with a purification filter 8, a carbon dioxide gas cylinder 9, and a number of syrup tanks 10. The purification filter 8 may purify tap water supplied from a braided tube 11 and may supply the purified water to inside the beverage supply apparatus 100 through a braided tube 12. The braided tube 12 may be connected to a carbonator (not depicted) provided inside the beverage supply apparatus 100, to the diluting water nozzles 5*a*, 5*c*, and to the nozzle 5*b*.

The carbon dioxide gas cylinder 9 may store compressed carbon dioxide gas. The carbon dioxide gas may be supplied to the carbonator through a braided tube 14 at a predetermined pressure (e.g., about 0.6 MPa) that may be set by a gas regulator 13. The carbon dioxide gas may be supplied to each syrup tank 10 through braided tubes 15 at a predetermined pressure (e.g., about 0.2 MPa) set by the gas regulator 13. The number of syrup tanks 10 may store different syrups. As mentioned above, these syrups may be used as a main syrup or a topping syrup. The syrups may be pushed out by gas pressure supplied from the carbon dioxide gas cylinder 9 and supplied to the nozzle 5*b* through the braided tubes 16.

Figure 4:
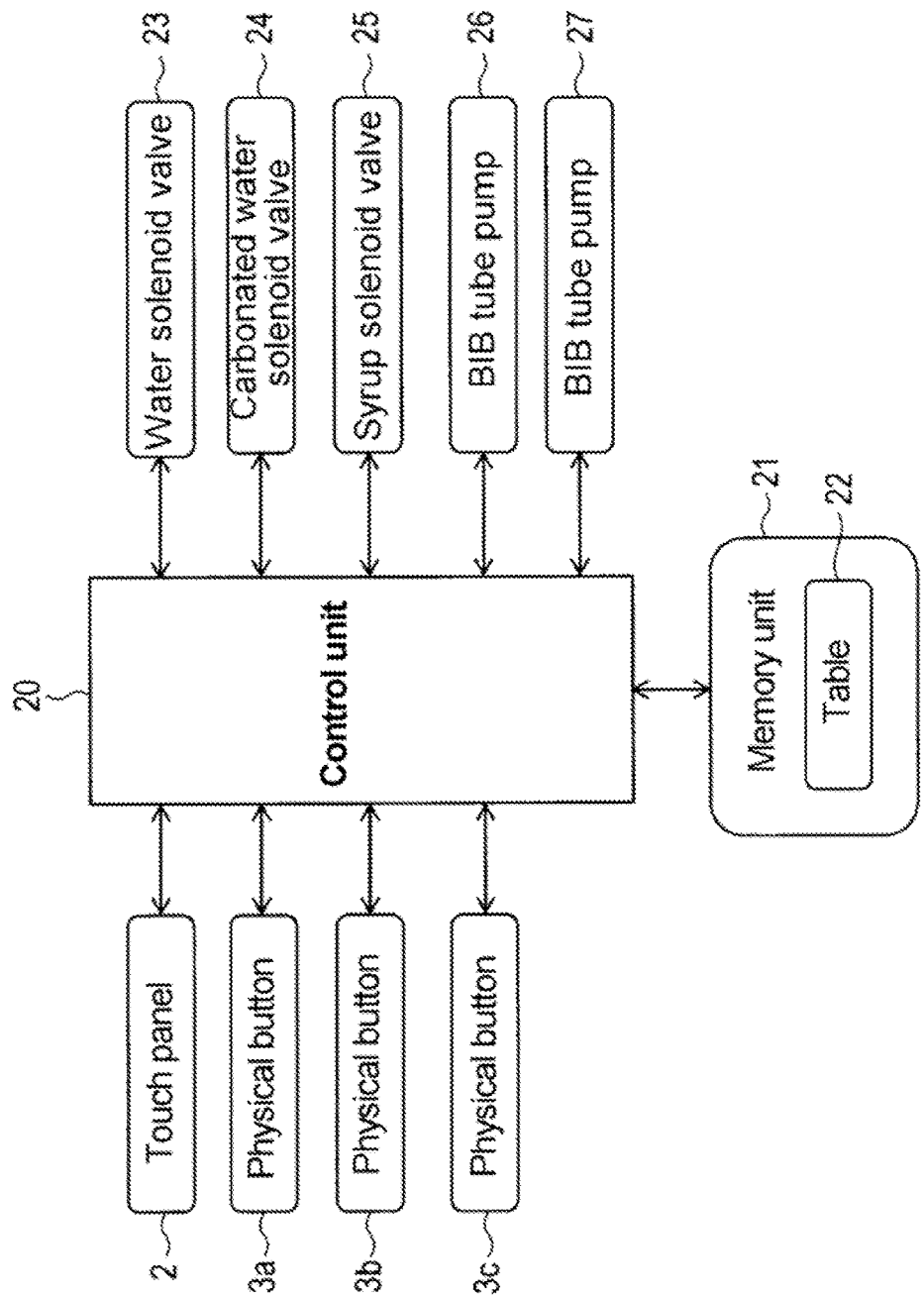
FIG. 4 is a functional block diagram of the beverage supply apparatus according to FIG. 1.

The function of the beverage supply apparatus 100 according to an embodiment of the present application and the control processing for supplying a beverage will be described next in the context of FIG. 4. FIG. 4 is a functional block diagram of the beverage supply apparatus 100 according to an embodiment of the present application.

The beverage supply apparatus 100 may include, in addition to the touch panel 2 and the physical buttons 3*a*-3*c* illustrated in FIG. 1: a control unit 20, a memory unit 21, a water solenoid valve 23, a carbonated water solenoid valve 24, a syrup solenoid valve 25, and a number of BIB tube pumps 26, 27. The control unit 20 may be a control device such as a central processing unit (CPU). The control unit 20 controls the functional units provided in the beverage supply apparatus 100. The memory unit 21 may be a memory device such as a read only memory (ROM) or a random access memory (RAM). The memory unit 21 stores, for example, a data table 22 and the like as will be described in more detail below. The control unit 20 may control beverage supply (production, discharge) and may control the touch panel 2 in accordance with data read out from the memory unit 21.

When a user performs an operation to select a beverage on the touch panel 2, the control unit 20 may read out data relating to the selected beverage from the memory unit 21 and may produce a beverage in accordance with the data. For example, this data may constitute data relating to the dilution ratio of water, carbonated water, main syrup, and topping syrup that may be registered in association with combinations of main syrup and topping syrup; setting data for controlling opening/closing of the solenoid valves (water solenoid valve 23, carbonated water solenoid valve 24, and syrup solenoid valve 25) in accordance with the dilution ratio; and setting data for controlling driving of the BIB tube pumps 26, 27.

For example, the beverage supply apparatus 100 may produce a main beverage by mixing water or carbonated water with a main syrup in a predetermined ratio and then may mix an undiluted topping syrup with the main beverage to produce a beverage. The control unit 20 thus may vary the abovementioned predetermined ratios when water or carbonated water is mixed with the main syrup, in accordance with the combination of main syrup and topping syrup. As a result, it may be possible to maintain the sugar content and the like of the beverage produced within a given range, regardless of the combination of main syrup and topping syrup.

It should be noted that the following description relates to a case in which the supply of the water, the carbonated water, the main syrup, and the topping syrup are controlled by opening/closing of the solenoid valves, but the supply may equally be controlled by means of a pump or the like.

When an operation to select a beverage is performed by a user on the touch panel 2, the control unit 20 may read out the table 22 from the memory unit 21. The table 22 constitutes information indicating the physical buttons 3a-3c corresponding to the beverage selected by the user. An example of the table 22 is shown in FIG. 5. As shown in FIG. 5, information relating to the physical buttons 3a-3c corresponding to the nozzles 5a-5c from which a beverage of the relevant brand is discharged (the physical buttons 3a-3c corresponding to the container placement locations 4a-4c where a beverage of the relevant brand is discharged) may be registered in the table 22 in association with beverage brands. It should be noted that the brands are indicated by letter in FIG. 5.

For example, brand D is associated with the physical button 3a in the table 22. When a beverage of brand D is selected by a user and the physical button 3a is depressed, a beverage of brand D produced in the manner described above is therefore supplied to a container placed in the container placement location 4a corresponding to the physical button 3a. Brand G is associated with the physical button 3b in the table 22. When a beverage of brand G is selected by a user and the physical button 3b is depressed, a beverage of brand G produced in the manner described above is therefore supplied to a container placed in the container placement location 4b corresponding to the physical button 3b. Brands A-C, E, F, and H-J, water, and carbonated water may be associated with the physical button 3c. When a beverage that is any of brands A-C, E, F, and H-J, water, or carbonated water is selected by a user and the physical button 3c is depressed, a beverage (e.g., a flavor-added beverage, water, or carbonated water) produced in the manner described above is therefore supplied to a container placed in the container placement location 4c corresponding to the physical button 3c. It should be noted that although water and carbonated water are not brands, water and carbonated water are treated as a type of brand in this embodiment for the sake of convenience.

When the control unit 20 detects that one of the physical buttons 3a-3c has been depressed, the control unit 20 may perform at least one control operation that involves opening and closing the solenoid valves 23-25 or driving the BIB tube pumps 26, 27 in order to supply water, carbonated water, main syrup, or topping syrup to the nozzle (diluting water nozzles 5a, 5c, nozzle 5b, or syrup nozzles 40, 41) corresponding to the physical button 3a-3c that has been depressed.

For example, if a beverage of any of the brands A-C, E, F, and H-J has been selected by a user and the physical button 3c has been depressed, the control unit 20 sets to an open state the syrup solenoid valve 25 provided between the nozzle 5c and the syrup tank 10 in which syrup (main syrup) of the selected brand may be stored, while also setting to an open state the water solenoid valve 23 and/or the carbonated water solenoid valve 24. It should be noted that when the water solenoid valve 23 and the carbonated water solenoid valve 24 are set to an open state, the control unit 20 may alternately set the water solenoid valve 23 and the carbonated water solenoid valve 24 to an open state, or set the solenoid valves to an open state simultaneously. By this means, the syrup and the water and/or carbonated water may be mixed in the nozzle 5c and the beverage obtained as a result may be discharged from the nozzle 5c.

It should be noted that when a flavor-added beverage has been selected by the user, the control unit 20 may set to an open state the syrup solenoid valve 25 provided between the nozzle 5c and the syrup tank 10 in which is stored a topping syrup of the flavor (e.g., a fruit flavor such as orange or grape) selected by the user, in addition to setting to an open state the syrup solenoid valve 25 provided between the nozzle 5c and the syrup tank 10 in which the main syrup is stored. By this means, a topping syrup also may be supplied to the nozzle 5c in addition to the main syrup and it may be possible to produce a flavor-added beverage by mixing these with water and/or carbonated water. In this case, the undiluted topping syrup may be added intermittently to the main beverage produced by mixing water or carbonated water with the main syrup in a predetermined ratio and the topping syrup is mixed with the main beverage.

When water has been selected by a user and the physical button 3c has been depressed, the control unit 20 may set to an open state the water solenoid valve 23 provided between the purification filter 8 and the nozzle 5b. Water may be discharged from the nozzle 5c as a result. When carbonated water has been selected by a user and the physical button 3c corresponding to the nozzle 5c has been depressed, the control unit 20 may set to an open state the carbonated water solenoid valve 24 provided between the carbonator and the nozzle 5c. Carbonated water may be discharged from the nozzle 5c as a result.

When a beverage of the brand D has been selected by a user and the physical button 3a has been depressed, the control unit 20 may drive, under predetermined conditions, the BIB tube pump 26 provided between the syrup nozzle 40 and the BIB 6 in which syrup of the selected brand D may be stored. At the same time, the control unit 20 also may set the water solenoid valve 23 to an open state and cause diluting water to be discharged from the diluting water nozzle 5a. As a result, a beverage in which syrup of the brand D and diluting water are mixed may be supplied to a container placed in the container placement location 4a.

When a beverage of the brand G has been selected by a user and the physical button 3b has been depressed, the control unit 20 may drive, under predetermined conditions, the BIB tube pump 27 provided between the syrup nozzle 41 and the BIB 7 in which syrup of the selected brand G may be stored. At the same time, the control unit 20 also may set the water solenoid valve 23 and/or the carbonated water solenoid valve 24 to an open state so as to cause diluting water and/or carbonated water to be discharged from the diluting water nozzle 5b and/or the carbonated water nozzle 42. As a result, a beverage in which syrup of the brand G and water and/or carbonated water are mixed may be supplied to a container placed in the container placement location 4b.

As described above, according to this embodiment, an undiluted topping syrup may be added to a main beverage produced by mixing water or carbonated water with a main syrup in a predetermined ratio and the undiluted topping syrup is mixed with the main beverage.

It is thus possible to considerably increase the options for flavors of beverage provided to a user by mixing two types of syrups, namely a main syrup and a topping syrup. The topping syrup may be added as a flavoring and therefore may be added in a small amount; if an excessive amount thereof is added, the balance of flavors between the main syrup and the topping syrup may break down. It therefore may be necessary to add correctly a predetermined amount of the topping syrup. In view of this, the topping syrup may be added in an undiluted state in this embodiment and variations in concentration caused by the dilution may be eliminated.

Furthermore, if the topping syrup is added in this kind of small amounts continuously over a long period of time, it may be difficult to control the amount of the topping syrup added. The topping syrup therefore preferably may be added over a period of time that may be as short as possible. In view of this, the topping syrup may be added intermittently in this embodiment. By this means, the topping syrup may be correctly added in a predetermined amount and it may be possible to prevent breakdown of the balance of flavors. As a result, it may be possible to provide to a user a beverage having a flavor that is in accordance with the flavor intended by the beverage manufacturer.

It should be apparent that the foregoing relates only to certain embodiments of the present application and the resultant patent. Numerous changes and modifications may be made herein by one of ordinary skill in the art without departing from the general spirit and scope of the invention as defined by the following claims and the equivalents thereof.

We claim:

1. A beverage supply apparatus that supplies at least one kind of beverages, the beverage supply apparatus comprising:
    an operation reception section that receives a first selecting operation for a first syrup that constitutes a main beverage brand by being diluted with water or carbonated water and a second selecting operation for a second syrup that is added to the main beverage brand as a flavor, the first and second syrups being selected from different kinds of syrups stored in a plurality of syrup tanks; and
    a mixing section that produces the main beverage brand by mixing the first syrup with the water or the carbonated water at a predetermined rate and mixes the main beverage brand with the second syrup in a non-diluted state to produce a beverage.

2. The beverage supply apparatus according to claim 1, wherein the mixing section intermittently supplies the second syrup to mix the second syrup with the main beverage brand.

3. The beverage supply apparatus according to claim 1, wherein the operation reception section comprises a touch panel.

4. The beverage supply apparatus according to claim 1, wherein the operation reception section comprises a plurality of physical buttons.

5. The beverage supply apparatus according to claim 1, wherein the second syrup comprises a non-diluted topping syrup.

6. The beverage supply apparatus according to claim 1, wherein the mixing section comprises a plurality of container placement locations.

7. The beverage supply apparatus according to claim 1, wherein the mixing section comprises a plurality of nozzles.

8. The beverage supply apparatus according to claim 1, wherein the mixing section comprises a plurality of pumps.

9. The beverage supply apparatus according to claim 1, further comprising a control section that changes, in accordance with a combination of the first syrup and the second syrup, the predetermined ratio of the first syrup to the water or the carbonated water when the first syrup and the water or the carbonated water are mixed together.

10. The beverage supply apparatus according to claim 9, wherein the control section comprises a data table.

11. The beverage supply apparatus according to claim 1, wherein the mixing section comprises a plurality of solenoid valves.

12. The beverage supply apparatus according to claim 11, wherein the mixing section comprises a compressed gas source.

13. A method of supplying at least one kind of beverages, comprising:
    storing a plurality of different kinds of syrup;
    selecting a first syrup from the plurality of different kinds of syrup;
    diluting the first syrup with a diluent at a predetermined rate to form a main beverage brand;
    selecting a non-diluted topping syrup from the plurality of different kinds of syrup; and
    mixing the main beverage brand and the non-diluted topping syrup to produce a beverage.

\* \* \* \* \*